(12) United States Patent
Kupratis

(10) Patent No.: US 10,533,493 B2
(45) Date of Patent: *Jan. 14, 2020

(54) ADAPTIVE FAN REVERSE CORE GEARED TURBOFAN ENGINE WITH SEPARATE COLD TURBINE

(71) Applicant: United Technologies Corporation, Farmington, CT (US)

(72) Inventor: Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 418 days.

This patent is subject to a terminal disclaimer.

(21) Appl. No.: 15/202,720

(22) Filed: Jul. 6, 2016

(65) Prior Publication Data

US 2016/0326954 A1 Nov. 10, 2016

Related U.S. Application Data

(63) Continuation of application No. 14/205,847, filed on Mar. 12, 2014, now Pat. No. 9,488,101.

(Continued)

(51) Int. Cl.
| | | |
|---|---|---|
| *F02C 3/10* | (2006.01) | |
| *F02C 3/107* | (2006.01) | |
| *F02C 3/14* | (2006.01) | |
| *F02C 7/36* | (2006.01) | |
| *F02K 3/077* | (2006.01) | |
| *F01D 5/02* | (2006.01) | |
| *F01D 15/12* | (2006.01) | |

(Continued)

(52) U.S. Cl.
CPC ............... *F02C 3/107* (2013.01); *F01D 5/02* (2013.01); *F01D 15/12* (2013.01); *F02C 3/145* (2013.01); *F02C 7/36* (2013.01); *F02K 3/077* (2013.01); *F04D 19/007* (2013.01); *F04D 25/045* (2013.01); *F05D 2220/32* (2013.01); *F05D 2240/35* (2013.01); *F05D 2260/40311* (2013.01)

(58) Field of Classification Search
CPC ...... F02C 6/02; F02C 3/10; F02C 3/13; F02C 3/107; F02C 3/145; F02C 7/36; F02K 3/06; F02K 3/065; F02K 3/076; F02K 3/077; F05D 2260/4023; F05D 2260/4031; F05D 2260/40311
USPC ...................................... 60/774, 792, 39.163
See application file for complete search history.

(56) References Cited

U.S. PATENT DOCUMENTS

| | | |
|---|---|---|
| 4,043,121 A | 8/1977 | Thomas et al. |
| 4,064,692 A | 12/1977 | Johnson et al. |

(Continued)

FOREIGN PATENT DOCUMENTS

WO 2011/162845 A1 12/2011

*Primary Examiner* — Steven M Sutherland
(74) *Attorney, Agent, or Firm* — Carlson, Gaskey & Olds, P.C.

(57) ABSTRACT

A turbine engine includes a first fan including a plurality of fan blades rotatable about an axis and a reverse flow core engine section including a core turbine axially forward of a combustor and compressor. The core turbine drives the compressor about the axis and a transmission system. A geared architecture is driven by the transmission system to drive the first fan at a speed less than that of the core turbine. A second fan is disposed axially aft of the first fan and forwarded of the core engine and a second turbine is disposed between the second fan and the core engine for driving the second fan when not coupled to the transmission.

11 Claims, 2 Drawing Sheets

Related U.S. Application Data

(60) Provisional application No. 61/782,610, filed on Mar. 14, 2013.

(51) Int. Cl.
    *F04D 19/00* (2006.01)
    *F04D 25/04* (2006.01)

(56) References Cited

U.S. PATENT DOCUMENTS

| | | |
|---|---|---|
| 4,080,785 A | 3/1978 | Koff et al. |
| 4,376,375 A | 3/1983 | Boudigues |
| 5,794,432 A | 8/1998 | Dunbar et al. |
| 5,816,042 A | 10/1998 | Guinan et al. |
| 6,102,329 A | 8/2000 | Guinan et al. |
| 7,246,484 B2 | 7/2007 | Giffin, III et al. |
| 7,926,290 B2 | 4/2011 | Johnson et al. |
| 8,104,265 B2 | 1/2012 | Kupratis |
| 8,127,528 B2 | 3/2012 | Roberge |
| 8,209,952 B2 | 7/2012 | Ress, Jr. |
| 2004/0060279 A1 | 4/2004 | Joseph et al. |
| 2005/0024129 A1 | 2/2005 | Jang |
| 2007/0119150 A1 | 5/2007 | Wood et al. |
| 2010/0031669 A1 | 2/2010 | Ensign |
| 2010/0223902 A1 | 9/2010 | Mailander et al. |
| 2011/0056208 A1 | 3/2011 | Norris et al. |
| 2011/0120079 A1 | 5/2011 | Schwark, Jr. et al. |
| 2011/0150627 A1 | 6/2011 | Baughman |
| 2011/0150633 A1 | 6/2011 | Baughman |
| 2011/0167792 A1 | 7/2011 | Johnson et al. |
| 2012/0233980 A1 | 9/2012 | Heathco |
| 2012/0272656 A1 | 11/2012 | Norris |

ADAPTIVE FAN REVERSE CORE GEARED TURBOFAN ENGINE WITH SEPARATE COLD TURBINE

CROSS REFERENCE TO RELATED APPLICATION

This application is a continuation of U.S. application Ser. No. 14/205,847 filed on Mar. 12, 2014, which claims priority to U.S. Provisional Application No. 61/782,610 filed on Mar. 14, 2013.

STATEMENT REGARDING FEDERALLY SPONSORED RESEARCH OR DEVELOPMENT

This subject of this disclosure was made with government support under Contract No.: FA8650-09-D-2923/D013 awarded by the United States Air Force. The government therefore may have certain rights in the disclosed subject matter.

BACKGROUND

A gas turbine engine typically includes a fan section and a core engine including compressor section, a combustor section and a turbine section. Air entering the compressor section is compressed and delivered into the combustion section where it is mixed with fuel and ignited to generate a high-energy exhaust gas flow. The energetic gas flow expands through the turbine section to drive the compressor and the fan section and finally exits through a thrusting nozzle.

Typically, the compressor is axially forward of the compressor and turbine sections. In some gas turbine engine configurations known as reverse flow turbine engines, the turbine section is axially forward of the combustor and compressor. Airflow is ducted aft to the compressor, than forward to the combustor and turbine where exhaust gases are exhausted forward and mixed within incoming airflow. Such reverse flow engine can provide performance advantages and efficiencies.

Airflow through the gas turbine engine is typically divided between a core flow path and a bypass flow path. More flow through the bypass passage as compared to the core flow path typically provides increased fuel efficiency at the expense of overall thrust. Engines for high speed aircraft include smaller bypass passages to provide greater thrusts. Fuel efficiency is therefore balanced against thrust requirements and smaller bypass flows are utilized when greater thrusts are desired.

A variable cycle gas turbine engine may switch between highly fuel efficient operation with increased bypass airflow and high speed operation with less bypass flow with more thrust produced by the core engine.

Although variable cycle gas turbine engines have improved operational efficiency, turbine engine manufactures continue to seek further improvements to engine performance including improvements to propulsive efficiency.

SUMMARY

A turbine engine according to an exemplary embodiment of this disclosure, among other possible things includes a first fan including a plurality of fan blades rotatable about an axis. A reverse flow core engine section includes a core turbine axially forward of a combustor and a compressor. The core turbine drives the compressor about the axis. A transmission system is driven by the core turbine. A geared architecture is driven by the transmission system for driving the first fan at a speed less than the core turbine. A second fan is disposed axially aft of the first fan and forwarded of the core engine. A second turbine is disposed between the second fan and the core engine. The second turbine drives the second fan.

In a further embodiment of the foregoing turbine engine, the transmission includes a first mode. The second fan is coupled to the transmission and driven at the speed of the core turbine.

In a further embodiment of any of the foregoing turbine engines, the transmission includes a second mode. The second fan is driven at a speed less than that of the core turbine and greater than that of the first fan.

In a further embodiment of any of the foregoing turbine engines, the second fan and second turbine are fixed to rotate at a common speed.

In a further embodiment of any of the foregoing turbine engines, the second turbine drives the second fan responsive to the transmission decoupling from the second fan.

In a further embodiment of any of the foregoing turbine engines, includes a variable vane disposed axially forward of the second turbine for controlling a speed of the second turbine and thereby the second fan.

In a further embodiment of any of the foregoing turbine engines, the transmission includes a first transmission path coupling the core turbine to the second fan and the geared architecture such that second fan rotates at a speed common with the core turbine.

In a further embodiment of any of the foregoing turbine engines, the transmission includes a second transmission path through a gear reduction to drive the second fan at a speed less than that of the core turbine and greater than the first fan.

A method of operating a turbine engine according to an exemplary embodiment of this disclosure, among other possible things includes defining a core gas flow path through a core engine, where the core engine includes a compressor, a combustor in communication with the compressor and a core turbine driven by high energy gas flow generated by the combustor, driving a transmission with the core turbine, driving a first fan through a geared architecture driven by the transmission, driving a second fan axially aft of the first fan and forward of the core turbine, the second fan is driven by the transmission at a speed common with the core turbine in a first mode, and driving the second fan with a second turbine disposed axially forward of the core turbine when the transmission is in a second mode.

In a further embodiment of the foregoing method, in the second mode the second fan is driven at a speed less than that of the core turbine and greater than that of the first fan.

In a further embodiment of any of the foregoing methods, the second fan and second turbine are fixed to rotate at a common speed and speed of the second turbine is varied to change the speed of the second fan when decoupled from the transmission.

In a further embodiment of any of the foregoing methods, the second turbine drives the second fan responsive to the transmission decoupling from the second fan.

In a further embodiment of any of the foregoing methods, the transmission includes a first transmission path coupling the core turbine to the second fan and the geared architecture such that second fan rotates at a speed common with the core turbine in the first mode.

In a further embodiment of any of the foregoing methods, the transmission includes a second transmission path through a gear reduction to drive the second fan at a speed less than that of the core turbine and greater than the first fan in the second mode.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
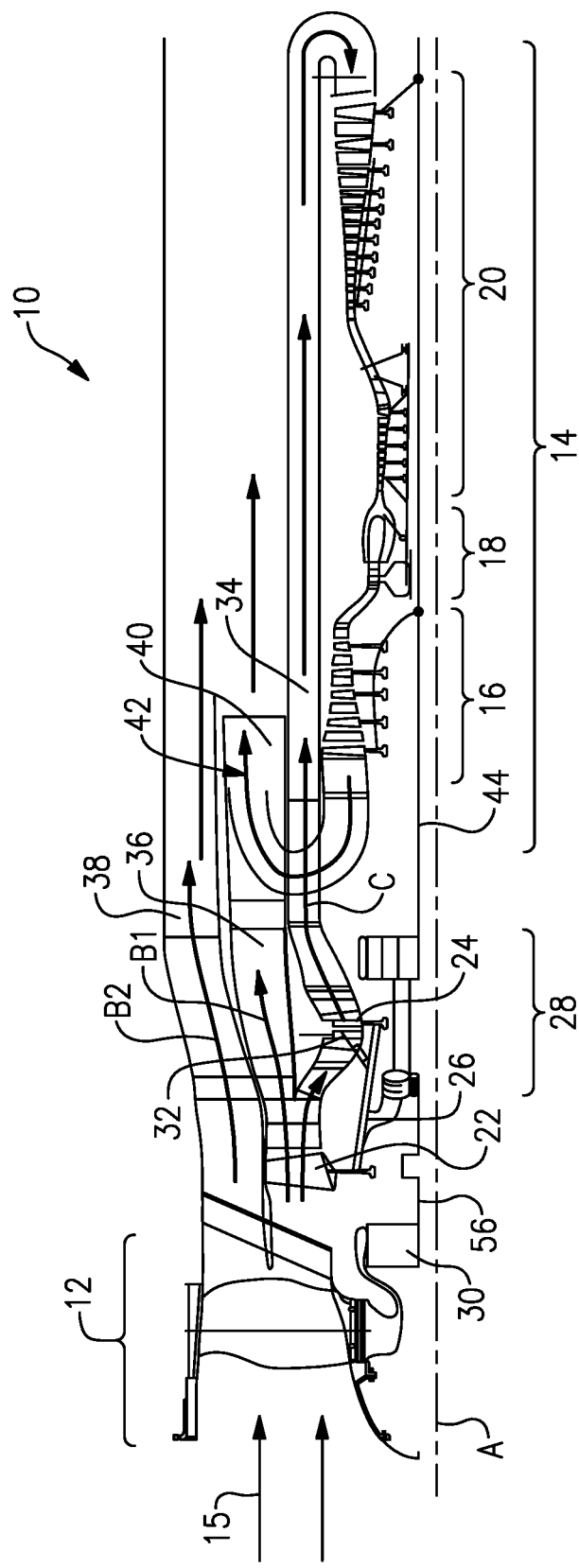
FIG. 1 is a schematic view of an example reverse flow turbine engine.

FIG. 1 schematically illustrates an example gas turbine engine 10 that includes a first fan 12 that is driven by a core engine section 14. The core engine section 14 in this engine is known as a reverse flow gas turbine engine. The reverse flow gas turbine engine 14 includes a compressor 20, a combustor 18 and a core turbine 16. The core turbine 16 is disposed axially forward of the combustor 18 and the compressor section 20. Incoming air flow 15 proceeds through the first fan 12 into a core flow path 34 where it is directed to an aft portion of the core engine 14 into the compressor 20. In the compressor 20, the incoming air 15 is compressed and fed to a combustor 18. In the combustor 18, the high pressure air is mixed with fuel and ignited to create a high energy gas flow. The high energy gas flow expands through the core turbine 16. The high energy exhaust gasses are exhausted through an exhaust mixer 40 where the exhaust gasses 42 are mixed with bypass air flows B1 and B2 through a corresponding first bypass passage 36 and a second bypass passage 38. The mixed air flow of exhaust gasses 42 and incoming air flow 15 are then exhausted out of the aft end of the engine 10.

The core turbine 16 drives a shaft 44 that in turn drives a transmission 28. The transmission 28 drives the fan 12 through a geared architecture 30. The transmission 28 is coupled through a coupling shaft 56 to the geared architecture 30 such that the first fan 12 will rotate at a speed less than the speed of the core turbine 16 and transmission 28.

The transmission 28 is further coupled to a free spool 26. The free spool 26 includes a second fan 22 that is coupled to a second turbine 24. The second turbine 24 is disposed within a core flow path C such that incoming air 15 drives the second or cold turbine 24. The second turbine 24 does not include a rotating shroud for the radially outer tip within the core flow passage 34.

The example gas turbine engine 10 includes the reverse flow core engine 14 that drives the first fan section 12 and includes the adaptive fan 22 that rotates at variable speeds to adapt the engine to various thrust requirements. As appreciated, a significant amount of incoming air 15 is compressed and driven through the bypass passages 36 and 38. The more air flow 15 that is directed and generates thrust through the bypass passages 36 and 38, the more fuel efficient the engine operates. However, in some instances it is desired to increase thrust, and thereby increase air flow through the core flow path C is desired. In these circumstances, the second fan section 22 is varied in speed to distribute air between the first bypass 36 and the core flow path 34 to provide the desired specific thrust from the example engine 10.

The second fan 22 is selectively driven by the transmission 28 at a speed common with the core turbine 16 or decoupled from the core turbine 16 to rotate at a speed less than that of the core turbine 16 but greater than that of the first fan 12.

Figure 2:
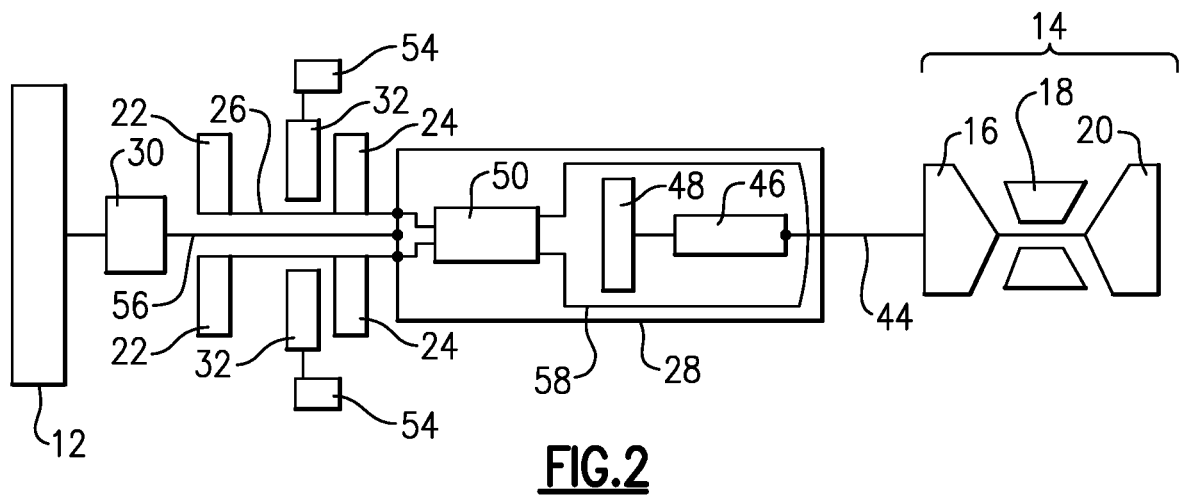
FIG. 2 is a schematic view of the example reverse flow turbine with an example transmission in a first torque transmitting condition.

Referring to FIG. 2 with continued reference to FIG. 1, the example engine 10 is shown schematically and includes the transmission 28. The transmission 28 includes a clutch 50 and a gear reduction 46. The example gear reduction 46 is coupled to the shaft 44 and drives the free spool 26 through a clutch mechanism 48. The clutch mechanism 50 provides for the direct transmission of torque from the shaft 44 to the free spool 26. The gear reduction 46 drives both the first fan 12 and second fan 22 at a speed slower than the core turbine 16.

The example engine 10 in FIG. 2 is shown with the transmission 28 in a first, high speed mode where torque is transmitted along a first load path 58 through the clutch 50. The clutch 50 includes no gear reduction or other speed reduction devices and therefore directly transmits the speed of the core turbine 16 to the free spool 26. The speed of the free spool 26 is therefore equal to that of the core turbine 16.

The first fan 12 is driven by the transmission 28 through the geared reduction 30 and therefore always rotates at speed less than that of the core turbine 16. With the first fan 12 and the second fan 22 rotating at maximum speeds, a maximum amount of airflow is driven through the core flow path 34 and the first bypass passage 40 to produce a maximum engine thrust.

Figure 3:
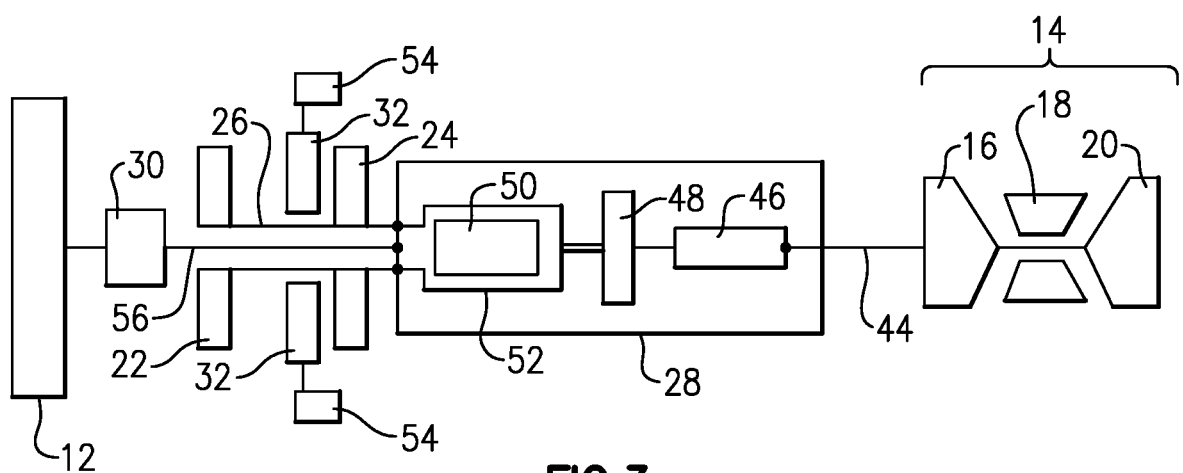
FIG. 3 is a schematic representation of the example reverse flow turbine with the example transmission in a second torque transmitting condition.

Referring to FIG. 3, with continued reference to FIG. 1, the transmission 28 is shown in a second, low speed mode where the example gear reduction 46 is coupled to the shaft 44 and drives the free spool 26 through the clutch mechanism 48. In the second mode of operation, torque is transmitted through the geared reduction 46 and clutch 48 such that the second fan 22 will rotate at a speed less than that of the core turbine 16. The gear reduction 46 further drives the geared architecture 30 such that the first fan runs at a slower speed than in with the transmission in the first mode.

As appreciated, because the core turbine 16 is driving the gear reduction 46 of the transmission 28, both the fan section 12 and the free spool 26 including the second fan 22 will rotate at a speed less than that of the core turbine 16. The second fan 22 or free spool 26 will rotate at a speed that is greater than that of the first fan 12 due to the gear reduction provided by the geared architecture 30. The gear reduction 46 as part of the transmission 28 includes a gear reduction that provides that the free spool 26 will rotate at a speed greater than the first fan 12 but less than that of the core turbine 16.

In the second mode shown in FIG. 3, torque is transmitted through the second load path 52 through the gear reduction 46 and the clutch 48. In this configuration, the free spool 26 will rotate at a speed that is greater than that of the first fan 12 but less than that of the core turbine 16.

Moreover, the clutch 48 may be disengaged and therefore not transmit torque to the free spool 26 such that the second fan 22 is driven entirely by the second turbine 24. The speed of the second turbine 24 is in turn varied and controlled by way of a variable vane 32. The variable vane 32 is moveable between a first position and a second position by an actuator 54. As appreciated, the first and second positions are positions that direct air flow into the turbine 24 to govern the speed of the second turbine 24 and thereby of the second fan 22. The alteration and adjustment of the speed of the second turbine 24 and air swirl of the second fan 22 changes the condition of the core flow C and bypass flow B1. Control of air swirl of the second fan 52 controls flow through core flow C and bypass flow B1.

Accordingly, the example gas turbine engine provides for the variation of specific thrust by varying flow through the various bypass passages and by directing torque in a variable manner between the first fan 12 and the second fan 22.

Although a dual annular bypass flow gas turbine engine is indicated, the features of the disclosed invention could be utilized in an engine where only a single annular bypass passage is utilized.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A turbine engine comprising:
   a first fan including a plurality of fan blades rotatable about an axis;
   a reverse flow core engine section including a core turbine axially forward of a combustor and a compressor, the core turbine driving the compressor about the axis;
   a transmission system driven by the core turbine;
   a geared architecture driven by the transmission system for driving the first fan at a speed less than the core turbine;
   a second fan disposed axially aft of the first fan and forward of the core engine; and
   a second turbine disposed between the second fan and the core engine, the second turbine driving the second fan.

2. The turbine engine as recited in claim 1, wherein the second fan and second turbine are fixed to rotate at a common speed.

3. The turbine engine as recited in claim 2, wherein the second turbine drives the second fan responsive to the transmission decoupling from the second fan.

4. The turbine engine as recited in claim 3, including a variable vane disposed axially forward of the second turbine for controlling a speed of the second turbine and thereby the second fan.

5. The turbine engine as recited in claim 1, wherein the transmission system includes a first transmission path coupling the core turbine to the second fan and the geared architecture such that the second fan rotates at a speed common with the core turbine.

6. The turbine engine as recited in claim 5, wherein the transmission system includes a second transmission path through a gear reduction to drive the second fan at a speed less than that of the core turbine and greater than the first fan.

7. A method of operating a turbine engine comprising:
   defining a core gas flow path through a core engine, where the core engine includes a compressor, a combustor in communication with the compressor and a core turbine driven by high energy gas flow generated by the combustor;
   driving a transmission with the core turbine;
   driving a first fan through a geared architecture driven by the transmission;
   driving a second fan axially aft of the first fan and forward of the core turbine, wherein the second fan is driven by the transmission at a speed common with the core turbine in a first mode; and
   driving the second fan with a second turbine disposed axially forward of the core turbine when the transmission is in a second mode.

8. The method as recited in claim 7, wherein the second fan and second turbine are fixed to rotate at a common speed and a speed of the second turbine is varied to change the speed of the second fan when decoupled from the transmission.

9. The method as recited in claim 8, wherein the second turbine drives the second fan responsive to the transmission decoupling from the second fan.

10. The method as recited in claim 8, wherein the transmission includes a first transmission path coupling the core turbine to the second fan and the geared architecture such that second fan rotates at a speed common with the core turbine in the first mode.

11. The method as recited in claim 10, wherein the transmission includes a second transmission path through a gear reduction to drive the second fan at a speed less than that of the core turbine and greater than the first fan in the second mode.

* * * * *